Nov. 20, 1928.                                                                  1,692,649
G. W. GOODRIDGE ET AL
JUMP RING COUPLING
Filed March 1, 1927

INVENTORS
GILBERT W. GOODRIDGE
WILLIAM J. GAGNON by their attorneys

Howson and Howson

Patented Nov. 20, 1928.

1,692,649

UNITED STATES PATENT OFFICE.

GILBERT W. GOODRIDGE, OF FAIRFIELD, AND WILLIAM J. GAGNON, OF BRIDGEPORT, CONNECTICUT, ASSIGNORS TO THE BEAD CHAIN MANUFACTURING COMPANY, OF BRIDGEPORT, CONNECTICUT, A CORPORATION OF CONNECTICUT.

JUMP-RING COUPLING.

Application filed March 1, 1927. Serial No. 171,846.

Our invention relates to couplings, more particularly chain couplings, and is especially useful where a coupling is desired which will serve either as a splicing link for a chain or as a means for connecting a ring to the end of a chain.

One object of our invention is to provide a coupling which can be easily and quickly attached to the end of a ball chain and which will serve to connect a ring thereto. Another object is to provide a simply-constructed coupling which may also be used as a splicing link for ball chains. A further object is the provision of a simple, reliable and durable coupling which cannot be easily broken, distorted or gotten out of order. Still a further object is to provide a coupling which can be manufactured upon the ordinary ball chain machine requiring only slight changes and adjustments in the dies and forming parts. Other objects will be apparent from a consideration of this specification.

We have discovered that these objects may best be obtained by the use of a capsule formed from a single piece of metal, and we have illustrated our invention by the accompanying drawings, in which, Figure 1, is a view of one embodiment of the invention wherein a ring is connected to the end of a ball chain;

Figure 1:
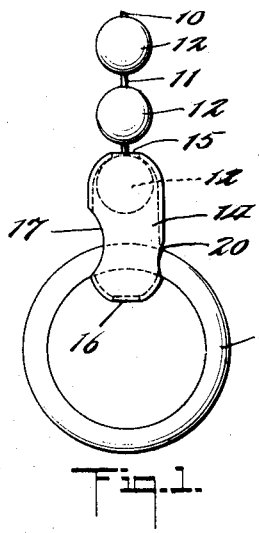

While we have shown our invention embodied in a ball chain connector for which it is especially useful, it may be clearly embodied by appropriate adaptation in a connector used for joining other types of chain or other parts having expanded ends. Thus any expanded end having a constricted part immediately behind it is adapted for connection with a coupling constructed in accordance with the present invention. The drawings and following description are therefore merely illustrative of the underlying features of the invention.

The coupling consists essentially of a hollow capsule formed from a single blank with apertures and surfaces adapted to receive and retain the parts which it is desired to couple together. In the drawings there is shown a ball chain 10 composed of dumb-bells 11 and hollow balls 12 fastened together in the usual way. To the end of this chain a jump ring 13 or another chain end is attached by means of the novel coupling 14.

Figure 2:
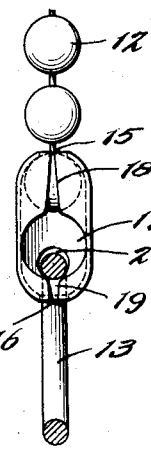
Fig. 2 shows the embodiment illustrated in Figure 1, when viewed from the left in Figure 1, the ring being cut in two.

In the embodiment illustrated in Figs. 1 and 2 the capsule has a hole 15 in one end and a hole 16 in the other, and in its side there is a hole 17. Each of the holes 15 and 16 is made slightly larger than the neck of a dumb-bell 11 for a reason which will later appear. The hole 17, however, is of sufficient size to admit to the capsule one of the balls 12 of the ball chain 10.

Connecting the side hole 17 and the end hole 15 is a slot 18; and a similar slot 19 connects the side hole 17 with the end hole 16. Each of these slots is designed to permit the passage therethrough of one of the dumb-bells 11 and the slots are preferably tapered in such a way that they contract as they approach the holes 15 and 16 respectively. The extent of this contraction is such that the dumb-bell neck must be forced into the end hole against the resiliency of the capsule.

Figure 4:
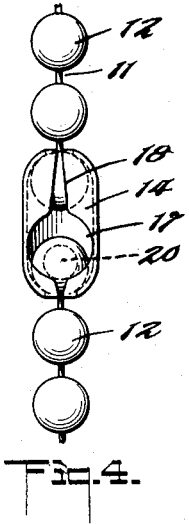
Fig. 4 is a view similar to Fig. 2 showing the capsule employed as a coupling for two chain ends.
Figure 5:
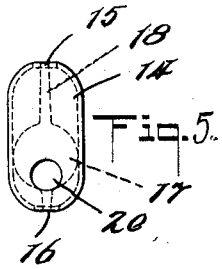
Fig. 5 is a back view of the form of capsule illustrated in Fig. 2.
Figure 6:
Fig. 6 is a bottom view of the capsule shown in Fig. 7 or a top view of Fig. 7.

It is thus possible to attach the capsule 14 to the end of a ball chain by inserting the end ball into the hole 17 and forcing the neck of the dumb-bell 11 attached to this ball through the slot 18 or the slot 19 into the end hole 15 or the end hole 16. A connection of two chain ends is illustrated in Fig. 4.

For connecting a ring to the end of a chain, a second hole 20 is formed in the side of the capsule 14 directly opposite the hole 17. The hole 20 is preferably made smaller than the hole 17, although it is not necessary that it be so made. The hole 20 has been illustrated in the drawings as being of sufficient size to permit the passage of the ring 13 therethrough, but of insufficient size for a ball 12 to pass. Obviously the smaller the hole 20 the stronger the capsule. The hole 20 is so spaced longitudinally of the capsule that its edge and the edge of the hole 17 on the opposite side are equidistant from the end of the capsule. It is thus possible to insert a ring 13 through the side holes 20 and 17 and have it supported equally by the lower edge of each hole.

Figure 3:
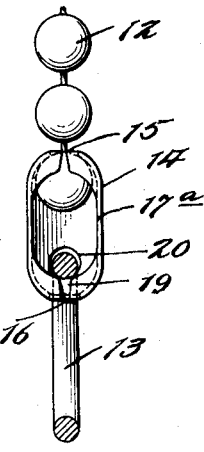
Fig. 3 illustrates a variation whereby the end ball of the chain may be inserted in the capsule after the ring is in place.

It will be noted that in Fig. 2 the end ball must be inserted into the capsule before the ring is attached. It may be desired, however, to fasten the coupling and jump ring together as a unit and to attach this unit to a chain as desired. Obviously such an attachment is impossible where the capsule is constructed as illustrated in Figs. 1 and 2. An alternative construction may therefore be employed in which the hole 17 is extended in elliptical form 17$^a$ (Fig. 3), for such a distance along the capsule length that there is sufficient space to permit the end ball to enter the capsule with the ring in place.

Figure 7:
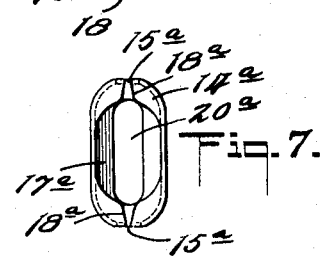
Fig. 7 shows another form of capsule in which the end ball of a chain may be inserted in either end.

In assembling a chain and ring connected by a capsule coupling, it frequently proves desirable to form the capsule in such shape that it is reversible. Accordingly another embodiment of the invention has been designed which is illustrated in Fig. 7. This capsule 14$^a$ has the elongated hole 17$^a$ illustrated in Fig. 3 and has its smaller side hole 20$^a$ elongated so that the edge nearest each end of the capsule and the corresponding edge of the hole 17$^a$ are equidistant from the end of the capsule. It is thus possible to insert a ring in the capsule at either end and have the same supported by the edges of both the hole 17$^a$ and the hole 20$^a$. It is also possible to insert the end ball of a ball chain into the capsule and pass the dumb-bell through the slot 18$^a$ at either end into the hole 15$^a$.

Figure 8:
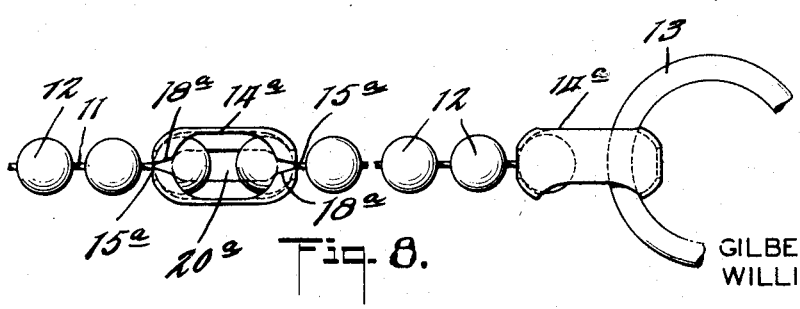
Fig. 8 shows the capsule illustrated in Fig. 7, used at one point as a coupling connecting two chain ends, and at another point as a coupling for a chain end and a ring.

The usefulness of applicants' capsule is illustrated in Fig. 8 where one capsule 14$^a$ is employed to couple two chain ends, and a second capsule 14$^a$ is employed to couple a ring 13 and the end of a ball chain. Ample room is provided in which to insert the end ball of a chain with either another end ball or a ring already attached to the coupling.

The simplicity of the coupling described is evident, and its strength is considerably increased when the hole 20 is made smaller than the hole 17. The part is also exceedingly useful and convenient as will be apparent.

With the understanding that the invention is susceptible of embodiment in various modified forms, and may be adapted for use with chains and parts of various kinds without departing from our underlying thought.

We claim:

1. A coupling for chains and the like comprising a one-piece capsule having a hole in its side to admit the chain end, a hole in its end, a slot connecting the two holes, and opposite said first hole another hole too small to permit the passage of the chain through which a ring may be inserted.

2. A coupling for chains and the like comprising a one-piece capsule having holes and slots for the chain connection and another hole for a ring connection, said second hole being disposed opposite a hole adapted to admit a chain end and of insufficient size to admit the chain end.

3. A coupling for chain ends or the like comprising a hollow capsule having a hole in its end adapted to accommodate a constricted part of the chain or the like, a hole in its side adapted to admit into the capsule an expanded end of the chain or the like, a slot connecting the two holes for the passage therethrough of the constricted part, the slot being contracted as it joins the end hole opposite the second hole to a width slightly smaller than that of the constricted part, and another hole adapted to permit the passage of a ring but not that of an expanded end of a chain or the like.

4. For attaching a ring to a chain, a coupling comprising a one-piece capsule having two oppositely positioned holes of sufficient size to permit the passage of the ring therethrough, their lowermost edges being equidistant from the chain connection, one of said holes being of sufficient size to admit an expanded chain end.

5. For attaching a ring to a chain, a coupling comprising a one piece capsule having two oppositely positioned holes of sufficient size to permit the passage of a ring therethrough, one of said holes being of sufficient size to admit an expanded chain end and each hole having two edges at an equal distance from each of the capsule ends.

In testimony whereof we have signed our names to this specification.

GILBERT W. GOODRIDGE.
WILLIAM J. GAGNON.